United States Patent [19]
Armstrong

[11] Patent Number: 4,939,848
[45] Date of Patent: Jul. 10, 1990

[54] VEHICLE FRAME ALIGNMENT GAUGE

[76] Inventor: Orville D. Armstrong, 8221 Ave. M, Santa Fe, Tex. 77510

[21] Appl. No.: 278,563

[22] Filed: Dec. 1, 1988

[51] Int. Cl.$^5$ ............................................. G01B 5/25
[52] U.S. Cl. ........................................ 33/608; 33/809
[58] Field of Search ................ 33/608, 286, 288, 809, 33/27.03, 533, 203.17, 203.2, 203.21, 342

[56] References Cited

U.S. PATENT DOCUMENTS

| | | |
|---|---|---|
| 916,912 | 3/1909 | Carrier . |
| 1,650,704 | 11/1927 | Gaa ........................................ 33/811 |
| 1,653,016 | 12/1927 | Mellor . |
| 1,804,448 | 5/1931 | Wochner . |
| 1,848,003 | 3/1932 | Chalupny ........................... 33/809 X |
| 2,086,402 | 7/1937 | Countryman ...................... 33/608 X |
| 2,532,376 | 12/1950 | Smith . |
| 2,542,561 | 2/1951 | Olejniczak ......................... 33/27.31 |
| 3,190,008 | 6/1965 | Weiss ................................ 33/27.03 X |
| 3,810,313 | 5/1974 | Hicks et al. . |
| 4,321,754 | 3/1982 | Colby . |
| 4,322,890 | 4/1982 | Jarman ............................... 33/608 X |
| 4,375,131 | 3/1983 | Jarman et al. . |
| 4,386,468 | 6/1983 | Whitney ................................ 33/608 |
| 4,561,187 | 12/1985 | Powell . |
| 4,800,651 | 1/1989 | Hanlon .............................. 33/288 X |

FOREIGN PATENT DOCUMENTS 118923  9/1918  United Kingdom .................. 33/809

OTHER PUBLICATIONS

Arn-Wood Co., Inc., 2/88 (brochure), (Date Unknown).
Pull-It Corporation, "Mo-Clamp", (brochure), (Date Unknown).

*Primary Examiner*—Harry N. Haroian
*Attorney, Agent, or Firm*—Browning, Bushman, Anderson & Brookhart

[57] ABSTRACT

An improved alignment gauge allows a vehicle to be easily checked for misalignment while the gauge is manually supported by an operator. The gauge comprises an elongate adjustable length beam and a needle indicator carried on the beam and having an axis perpendicular to the beam axis. In one embodiment, a second needle indicator is provided, and both a horizontal level and vertical level are permanently affixed to the beam. In another embodiment, the beam includes a centering member for engaging a centerline reference point along the vehicle, and the needle indicator axis passes through the beam axis. A left-side reference point may be quickly compared to a right-side reference point while the centering member remains in engagement with the centerline point on the vehicle. The present invention is highly versatile, and allows an operator to position one needle indicator about a selected reference point under a hood of the vehicle, with the second needle indicator positioned on a selected reference point on a wheel axis.

16 Claims, 2 Drawing Sheets

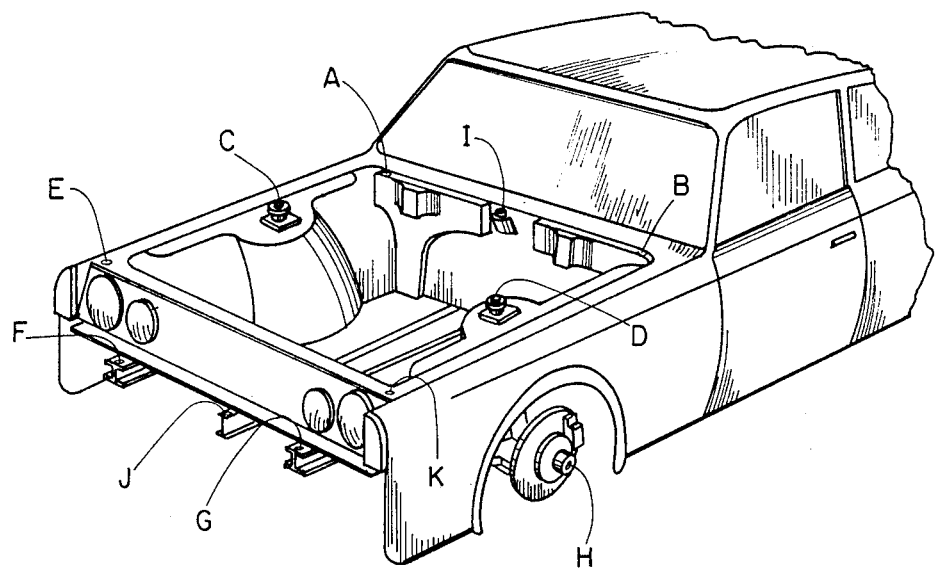
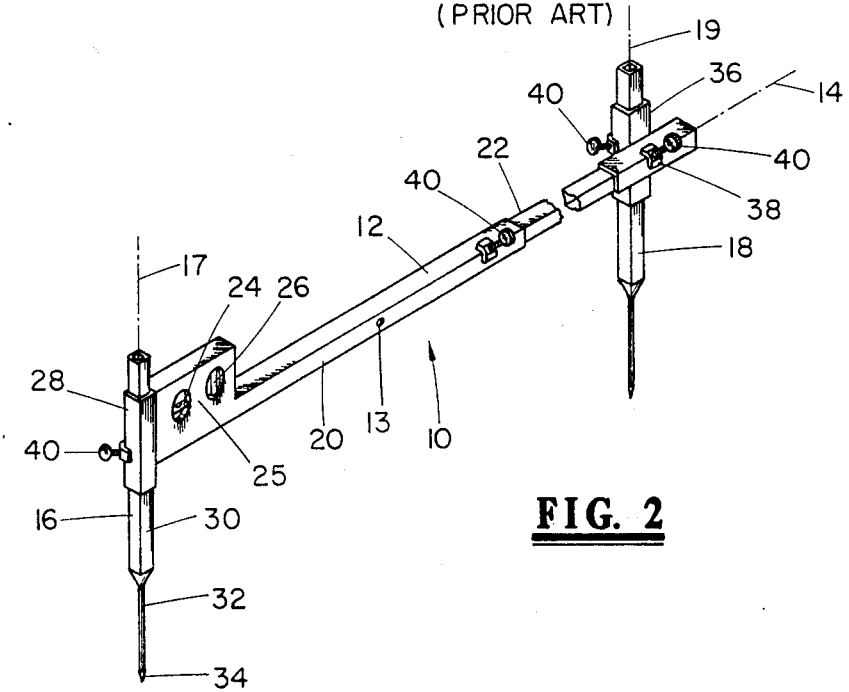
FIG. 1
(PRIOR ART)
FIG. 2

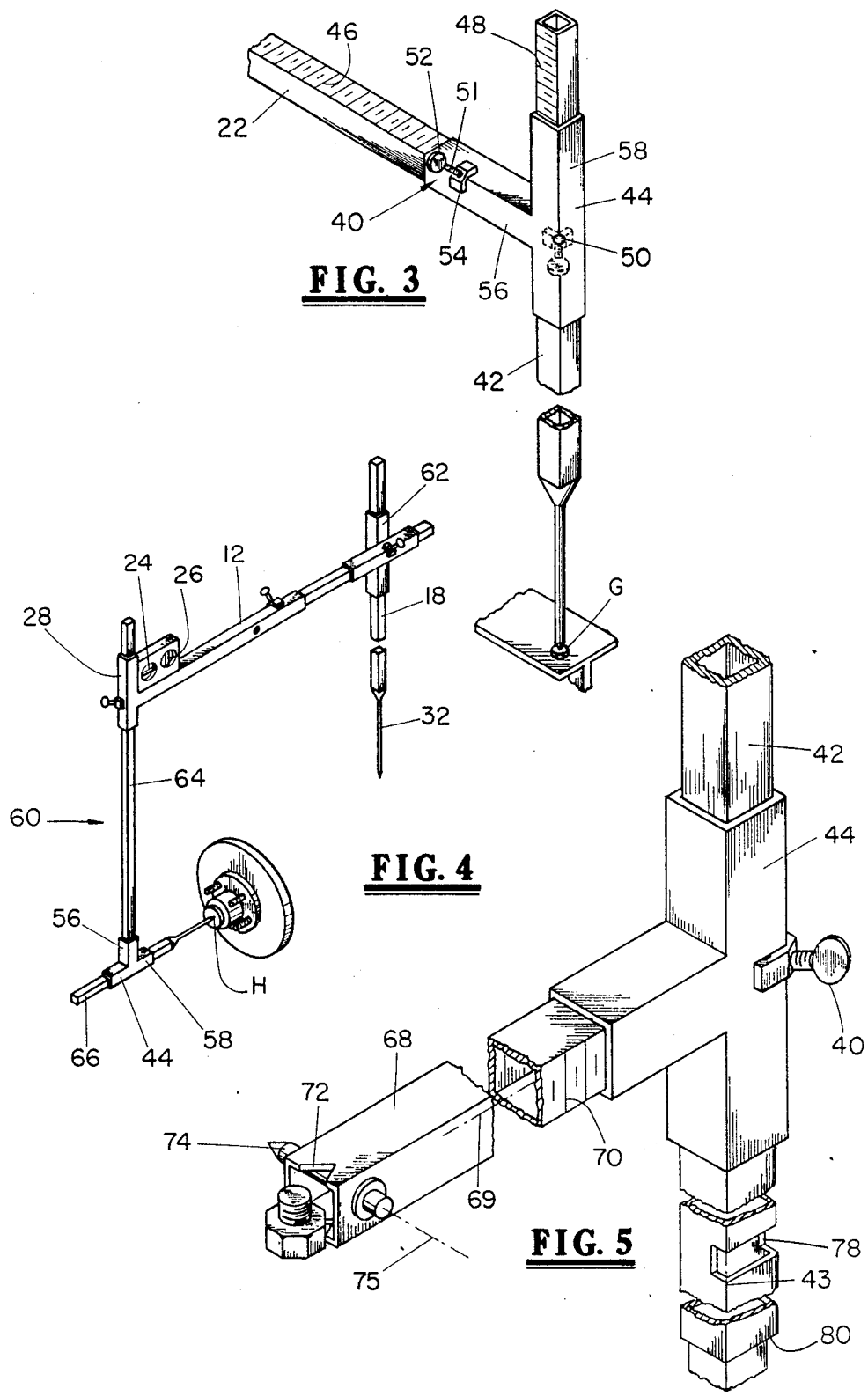

VEHICLE FRAME ALIGNMENT GAUGE

BACKGROUND OF THE INVENTION

1. Field of the Invention

The present invention relates to an improved alignment gauge, also referred to as a tram instrument, for checking the alignment of a vehicular frame. More particularly, the invention relates to an alignment gauge which can be easily and reliably used by body shop personnel to check the alignment of a car frame.

2. Description of the Prior Art

Various tools have been devised and used for decades to check the accuracy of reference points on an object by comparing measured distances with published data, or by comparing one set of measurements with other measurements taken for the same or similar reference points. A device for accomplishing this purpose, which has often been referred to as a trammel or tram gauge, generally comprises an elongate beam and one or more movable pins or needle indicators along the beam to measure or compare the distance between the reference points. A foldable trammel is disclosed in U.S. Pat. No. 916,912, and U.S. Pat. No. 1,653,016 discloses a mason's scale for leveling brick walls. U.S. Pat. No. 2,532,376 discloses a beam trammel with a cam-type locking head for temporarily fixing the needle indicator or pin along the trammel beam.

Unique problems are encountered when devising and using an adjustment gauge for checking various reference points on a frame of an automobile. Those skilled in the art appreciate that various publications list the correct distance between selected points on a car's frame, and gauges have long been used on cars involved in accidents to check those distances. An alignment gauge for use on car frames should be highly portable, relatively inexpensive and should be capable of being easily and reliably used by relatively inexperienced body shop personnel. U.S. Pat. No. 1,804,448 discloses a "tracking gauge" for detecting faults in the alignment of a vehicle's wheels. U.S. Pat. No. 3,810,313 discloses multiple frame gauges for suspending from a vehicular frame for checking misalignment.

In recent years, vehicular frames have generally been fabricated according to unibody techniques, so that the frame of the vehicle is structurally a unitary member, rather than comprising a plurality of frame components which are bolted together. This unitary construction emphasizes the neccessity for accurately checking the frame alignment, since a bent unibody frame can be expensive to correct. U.S. Pat. No. 4,321,754 discloses a vehicle alignment device suitable for use on a unibody-contructed automobile, and particularly one which includes a McPherson Strut system. U.S. Pat. No. 4,375,131 discloses the use of three gauges, each with a floor engagable base and upwardly projecting pins for checking the spacing between opposite sides of vehicle frame components relative to a longitudinal frame centerline. An elaborate frame alignment gauge is disclosed in U.S. Pat. No. 4,561,187, which is used by driving a vehicle onto a rack such that the centerline of an undamaged vehicle is directly above the elongate datum member. Plumb bob units are thereafter suspended from reference points on the frame, and slides and telescoping arms on the unit are adjusted to check the alignment of the frame.

A vehicular alignment gauged with a rectangular-shaped frame including a base for floor support is manufactured by Arn-Wood Co., Inc. This type of gauge is difficult and time consuming to set up, and has limited versatility. One of the more popular vehicular frame alignment gauges used today is the Mo-Clamp tram instrument manufactured by Pull-It Corp. This unit can be used to check dimensions between control points or reference points on the suspension and mechanical components of the vehicular frame. A bubble level is provided for horizontal leveling of the tram beam. A disadvantage of this gauge is that the vehicle centerline to left side reference point measurements cannot be easily compared with the vehicle centerline to right side reference point measurements. Vertical measurements between reference points also cannot be easily taken, and measurements or comparison between key reference points, such as a reference point on the cowl and a reference point on a bumper support, cannot be practically generated.

The disadvantages of the prior art are overcome by the present invention, and an improved alignment gauge is hereinafter disclosed for checking the alignment at selected locations on a vehicular frame.

SUMMARY OF THE INVENTION

The alignment gauge of the present invention includes an elongate adjustable length beam and at least two needle indicators each having its axis perpendicular to the beam axis. A horizontal level and a vertical level are each permanently fixed to the beam, so that both horizontal and vertically spaced reference points on a vehicle may be measured and/or compared.

According to one embodiment of the present invention, the adjustable length beam may be provided with a central notch and/or a center pin which lies within a reference plane defined by the beam axis and the needle indicator axis. The adjustable length indicator needle is secured to the beam by a T-shaped member, with the indicator needle having its axis perpendicular to and passing through the beam axis. Since the axis of the beam and the indicator needle define the reference plane, the central notch may be positioned against a central member lying along the centerline of the frame, and the indicator needle set to engage a left-side reference point. The beam may then be rotated with the central notch remaining in engagement with the central member, and the indicator moved to engage a corresponding right-side reference point to check alignment of the frame. A center pin is provided for engaging a central hole in the frame, and serves the same pupose as the center notch.

According to another embodiment of the present invention, the length of at least one of the indicators allows the indicator to contact a reference point on a bumper support of the vehicle, while the beam remains horizontal and the other indicator needle engages a selected reference point under the hood of the vehicle. The apparatus of the present invention also allows accurate measurement of the distances between vertical points, such as a wheel axis and the top of a strut. The adjustable length beam, the needle indicator support brackets, and at least a portion of the needle indicators are each preferably comprised of tubular members having a rectangular cross-sectional configuration, and a locking pin is preferably mounted to the outer tubular member for engaging a corner of the inner tubular member to accurately locate and fix the adjustable members together.

It is an object of the present invention to provide an improved alignment gauge for easily and reliably checking the alignment of a vehicular frame.

It is a further object of the invention to provide an alignment gauge which includes an adjustable length beam, at least two needle indicators each having a fixed axis perpendicular to the beam axis, and a horizontal level and a vertical level each permanently fixed to the beam.

It is a feature of the present invention that the alignment device be provided with a center notch which lies within a reference plane defined by the beam axis and the axis of a needle indicator secured to the beam by a T-shaped support bracket.

It is a further feature of the present invention to provide an alignment device for a vehicular frame which includes a center pin which lies within a reference plane defined by the beam axis and the axis of a needle indicator secured to the beam by a T-shaped support member.

It is a further feature of the present invention that the adjustable length members of the alignment device comprise tubular members each having a rectagular cross-sectional configuration, with a locking pin mounted on the outer tubular member for engaging a corner of an inner tubular member to precisely locate and fix the tubular members together.

An advantage of the present invention is that the operator may fix the adjustable length beam against a central member lying along the centerline of the frame, and set the indicator needle to engage a left side reference point. Thereafter, the alignment beam may be rotated while remaining in engagement with the central member, and moved so that the indicator needle engages the right side reference point to check alignment of the frame.

It is a further advantage of the present invention that the operator may check alignment of a vehicle by placing one needle indicator in engagement with a reference point preferably located under the hood of the car while placing the other indicator needle on a bumper support reference point, with the beam remaining in its horizontal position.

These and further objects, features, and advantages of the present invention will become apparent from the following detailed description, wherein reference is made to the figures in the accompanying drawings.

BRIEF DESCRIPTION OF THE DRAWINGS

FIG. 1 is a simplified pictorial view of a portion of a vehicle with the vehicle hood, engaging front bumper, and front wheels removed to illustrate exemplary reference points on or secured to the vehicular frame.

FIG. 2 is a pictorial view of the alignment device of the present invention arranged for measuring the distance between two horizontally spaced reference points.

FIG. 3 is a pictorial view of a portion of the device shown in FIG. 2 with a needle indicator for engaging a bumper support on the vehicle.

FIG. 4 is a pictorial view of an alignment device according to the present invention for measuring the vertical distance between the center of a wheel axis and a reference point under the hood of the vehicle.

FIG. 5 is a pictorial view of an alignment device according to the present invention in engagement with a center member on the vehicle for comparing left-side to right-side dimensions.

DESCRIPTION OF PREFERRED EMBODIMENTS

The alignment gauge of the present invention may be used for checking alignment of the frame of various types of vehicles. Although the invention will be hereinafter described for checking the alignment of a front portion of a unibody frame of a car, it should be understood that it is a feature of the present invention that the same alignment device may be used for checking the alignment of a rear frame portion of a car, and for checking alignment of both unibody and bolted frames. Also, the present invention may be used for verifying the alignment of various vehicles other than cars, such as trucks, trailers, buses, etc. Finally, it should be understood that although the device of the present invention is designed to detect misalignment of the vehicular frame, e.g. caused by an accident, the device need not directly engage the frame itself, and may detect frame misalignment by detecting variations from established measurements in components affixed to the frame, or by detecting misalignment because of differences between dimensional variations between similar frame-related components on the same or similar vehicles. Those skilled in the art appreciate that if vehicle misalignment is detected, various hand or power tools may be used to bend or pull the vehicle back into proper alignment. After each pulling operation, alignment is normally rechecked to verify the extent of the repair being made. Once the vehicle is brought back into alignment, it is customary to recheck or verify alignment of numerous reference points. This procedure and the tools used for bringing the vehicle back into alignment are well known to those skilled in the art, and thus are not discussed further below.

The vehicle simplistically depicted in FIG. 1 will thus be presumed to have been involved in an accident, and its hood, engine, front bumper, and front wheels have been removed for visual inspection and for calculating repair costs to obviously damaged components. The alignment device of the present invention may then be used for checking alignment of the vehicular frame, i.e. to ensure that the frame has been brought back into proper alignment. One of the features of this device is that various selected reference points on the vehicle may be easily and reliably checked by relatively inexperienced personnel. Yet the device of this invention is not complex or expensive to manufacture, is portable, and may be easily disassembled and stored when not in use.

For purposes of explanation, points A and B on the vehicle depicted in FIG. 1 are right side and left side reference points, respectively, along the cowl of the vehicle. Reference points C and D are corresponding points at the top of the strut members, while points E and K are right side and left side references points, respectively, to a front portion of the vehicle body or frame. Points F and G are corresponding reference points on the right side and left side bumper supports. I is a center bolt, and J is a center nut, each lying along the centerline of the vehicle. H is a centerpoint of the front left side wheel axis. It should be understood that the depicted reference points are merely exemplary reference points for checking the alignment of the vehicular frame, and numerous other reference points may be used in accordance with the present invention.

Before proceeding to discuss the apparatus of the present invention, it should be understood that the present invention enables numerous combinations of reference points on a vehicle to be checked and compared to established measurement data and/or similar measurements from the same or similar vehicles. Thus, the alignment device of the present invention may be used to check the horizontal distance between points A and B, and that distance compared to published data for the particular vehicle. Also, the present invention allows the comparative elevation of points A and B to be compared as described hereafter. Similarly, the actual dimensions between points C and D may be taken and compared to established data, as well as measurements between points E and K or between points F and G. The present invention also allows the vehicle to be leveled in a cross-configuration, so that the dimension between points A and D may be taken and compared to established data, or taken and compared to the dimension between points B and C. Similarly, measurements between points A and K may be compared to the dimension between points B and E. Likewise, A-G or C-G may be compared to B-F or D-F, respectively. Also, left-side and right-side measurements may be easily taken, so that the horizontal distance between points A and C, A and E, A and F, or C and F may similarly be measured and compared to established data, or measured or compared to the corresponding measurements between points B and D, B and K, B and G, or D and G, respectively.

As suggested by the foregoing, it is a feature of the present invention that the measurement between a bumper support and one or more reference points normally under the hood of the car can be easily taken. When taking each of the above described measurements, only the horizontal dimension between points may be measured (the trammel beam maintained horizontal), both the horizontal and the vertical distance between selected points may be measured (the trammel beam maintained horizontal) or the vector distance between points detected (regardless of whether the beam is horizontal) and compared with the distance between similar reference points.

Finally, it is a feature of the present invention that both the vertical and horizontal dimensions between a centerpoint H and a reference point under the hood, such as point D, may be measured and compared to similar dimensions, i.e. between the centerpoint on the right-side wheel and point C.

Referring now to FIG. 2, the alignment device 10 in one embodiment comprises a variable length elongate beam 12 having a center beam axis 14 and a pair of needle indicators 16 and 18 each having an axis 17, 19, respectively, perpendicular to axis 14. Beam 12 comprises an elongate external tubular 20 having a rectangular cross-sectional configuration, and a similarly configured inner tubular 22 slidably movable within tubular 20 to vary the length of the beam 12. A horizontal level 24 and a vertical level 26 are each permanently affixed to tubular 20 for ensuring that the beam 12 is truly horizontal or vertical during use. Each level 24, 26 preferably comprises a conventional bubble gauge, and both levels may be fixed to a unitary body 25.

A vertical tubular 28 is permanently connected to one end of the tubular 20, and has a rectangular cross-sectional passage for receiving a similarly configured upper tubular end 30 of needle indicator 16. The lower rod-like end 32 of indicator 16 has an axis along 17, and has a pointed end 34 for positioning on a selected reference point. Needle indicator 18 is similar to 16, and is positioned within vertical tubular 36 which is welded to horizontal tubular 38, which in turn receives inner tubular 22 therein. A plurality of threaded bolts 40 may be loosened or tightened for readjusting or temporarily fixing the position of any internal tubular with respect to its outer tubular, as shown.

Referring now to FIGS. 1 and 2, it should be understood that the pointed ends 34 of the indicator 16 and 18 may each be positioned on selected reference points, e.g. A and B. The spacing of the needle indicators along of the beam 12, and the vertical position of the needle indicators 16 and 18 within the tubulars 28 and 36, respectively, may thus be adjusted and fixed by manually tightening bolts 40, with the level 24 reflecting that beam 12 remains horizontal during this process. The inner tubular 22 may have conventional markings (see FIG. 3) so that the horizontal spacing of the needle indicators may be easily compared to published data. The upper portion of each needle indicator may also include conventional markings reflecting the distance from its respective pointed end 34, so that the operator will know that points A and B are at the same elevation when beam 12 is horizontal and the needle indicators 16 and 18 reflect the same distance from the beam 12 to the respective ends 34.

FIG. 3 depicts markings 46 on tubular 22 for measuring the length of the beam 12, and similar markings 48 on the needle indicator for measuring the vertical spacing between a reference point and the beam axis. The bolts or securing members between the rectangular-shaped tubulars are shown in greater detail in FIG. 3, and include bolt portion 51 having an upper flat head 52 to facilitate its manual rotation. An aperature 50 is provided at a corner and through a sidewall of the outer tubular, with the clip 54 being welded to the outer tubular so that its threaded aperature is placed over aperature 50. Thus the end of the bolt portion 51 engages a corner of the rectangular-shaped inner tubular, and forces the inner tubular into fixed engagement with the interior corner of the outer tubular radially opposite 40.

It should be understood that the apparatus shown in FIG. 2 may be used for measuring the distance between various selected locations on the vehicle. If a measurement between a bumper support and a selected point under the hood is to be taken, the needle indicator 18 as shown in FIG. 2 may be replaced with a substantially longer needle indicator 42, as shown in FIG. 3. The longer length of the needle indicator 43 thus allows the beam 12 to remain substantially horizontal while needle indicator 16 is located on a point under the hood, with needle indicator 42 in location at point G of the bumper support.

FIG. 3 also depicts that the cross-shaped bracket comprising tubulars 36 and 38 shown in FIG. 2 has been replaced with a unitary T-shaped bracket 44, with the latter bracket comprising a horizontal tubular portion 56 and vertical tubular portion 58. A significant advantage of the bracket 44 shown in FIG. 3 is that the tool of the present invention may be more easily used for comparing the distance between a center point on a car and similar right-hand and left-hand points on the car. By way of example, assume that the needle indicator 16 has its point 34 located in the center of bolt I, which is positioned along the centerline of the car. Using the bracket 44 and the longer needle indicator 42 as shown in FIG. 3, the point 34 of the needle indicator may be positioned on point G, with the beam 12 being horizontal. Thus the horizontal spacing between point I and point G can be easily determined. With the indicator 16 remaining on the point I, the tool may then be rotated so that the needle indicator 42 is positioned directly above point F. With the beam 12 again level, the point 43 on needle indicator 42 should be at point F if the car is in proper alignment. Thus the horizontal distance between I and G may be easily compared with the horizontal distance between points I and F by using the T-shaped bracket 44 and the elongate needle indicator 42 as shown in FIG. 5. This easy comparison could not be made, however, with the apparatus as shown in FIG. 2, since the centerline 19 of the needle indicator 18 does not pass through the centerline 14 of the beam 12.

FIG. 4 depicts another embodiment of the alignment gauge 60 according to the present invention. The elongate beam 12 may be constructed as described earlier and as shown in FIG. 2, with needle indicator 18 being carried on the beam by the cross-shaped bracket 62. An elongate inner tubular 64 may be positoned within the outer tubular 28, with its other end in portion 56 of T-shaped bracket 44. A second needle indicator 66 may then be placed in portion 58 of bracket 44, so that its end point is placed at a point H along the axis of the front wheel. Thus the device of the present invention can be effectively used to measure the horizontal and the vertical spacing between the front wheel axis and one or more selected locations under the hood of the vehicle.

As a further variation of the present invention, it should be understood that a tubular 64 and bracket 44 shown in FIG. 4 may be removed to measure only the vertical distance between selected points on the vehicle. In this case, the beam 12 may be positioned vertically with the needle indicator 66 provided within portion 28, with level 26 ensuring to ensure that the beam 12 is truly vertical. The length of the beam 12 may then be adjusted so that the rod-like portion 32 of the needle indicator 18 rests on top of a selected reference point, such as the top of a strut, thereby measuring the vertical distance between e.g. points H and D. Accordingly, it is a feature of the present invention that the beam 12 include both a horizontal level 24 and a vertical level 26 each permanently affixed to the beam 12, thereby substantially increasing the versatility of the present invention.

As a further feature of the present invention, it should be understood that the cross-shaped bracket 62 may be replaced by a T-shaped bracket, in which case the axes of beam 12, inner tubular 64, needle indicator 18, and needle indicator 66 each reside within the reference plane defined by the axes of the beam 12 and the needle indicator 18. Also, if a cross-shaped bracket 62 is used to connect the beam 12 and the needle indicator 18, a similarly configured bracket may be used to connect the beam 12 to the inner tubular 64, or a similar bracket may alternatively be used to interconnect tubular 64 and needle indicator 66, so that again the axis of the needle indicator 66 lies within the reference plane.

Still another embodiment of the present invention is shown in FIG. 5. An inner tubular member 68 having markings 70 thereon has one end secured to T-shaped bracket 44 as previously described, with indicator needle 42 affixed therein by securing member 40. The other end of the tubular member 68 includes one or more spaced notches 72 each having its center lying within a center plane of the tool, with the center plane being defined by a central axis 69 of tubular member 68 and the central axis 43 of needle indicator 42. Moreover, axis 43 is perpendicular to and passes through the axis 69. As shown in FIG. 5, one or both notches 72 may then be positioned against a rod-like member, bolt head, nut, or other device located along the centerline of the vehicle, so that corresponding right-side and left-side measurements taken and easily compared. By locating the notches along the center plane of the device, these measurements can be easily compared without adjusting the device, e.g. the distance between points I and K may be easily compared to the distance between points I and E without adjustment of the tool. Also, a pin 74 may be provided in the end of tubular 68, in which case the T-shaped bracket 44 may be rotated 90° so that the axis 75 of the pin will then be within the center plane of the device. Thus pin 74 may be fitted within a suitable hole or recess at point 1, and the I-K and I-E distances easily compared. Pin 74 may be removably positioned within the rectangular-shaped tubular 68, and held in place by a suitable snap spring or other movable securing member (not shown).

FIG. 5 also depicts a notch or groove 78 in the needle indicator 42, and a stop surface or edge 80 along the length of the needle indicator 42. Notch 78 and/or stop edge 80 allow the needle indicator to be easily positioned and held in place against an exterior and interior sheet metal edge surface of the vehicle to facilitate alignment checks at various selected points. Stop edge 80 also allows the needle indicator to "hang" from a reference plane, such as an edge surface defined by an irregularly shaped hole in the frame of the vehicle.

The inner and outer tubular members described herein are preferably fabricated from conventional square-shaped tubular goods. The width and height of the inner tubular member is preferably only slightly less than the width and height of the rectangular-shaped passageway within the outer tubular member, thereby minimizing "play" between the tubular members. As previously indicated, however, the detrimental affect of any play between the tubular members is substantially minimized by providing the securing members 40 which engage a corner of the inner securing member and thereby force the securing member against the opposite interior corner of the outer tubular member. The outer tubular member may be provided with a through aperture or site hole 13, as shown in FIG. 2, for alerting the operator when the inner tubular member is close to withdrawing completely from the outer tubular member.

The foregoing disclosure and description of the invention is illustrative and explanatory thereof, and various changes in the size, shape and materials as well as in the details of the illustrated construction may be made within the scope of the appended claims without departing from the spirit of the invention.

What is claimed is:

1. An alignment gauge for checking the alignment of a vehicular frame having a plurality of reference points thereon while the alignment gauge is manually supported by an operator, comprising:

an elongate and adjustable length beam including a tubular outer beam member and a tubular inner beam member slidably movable within the outer beam member, the adjustable length beam further having a central beam axis;

a first elongate needle indicator carried on the beam and having a first tip end for positioning on the vehicle about a first reference point and selectively movable with respect to the beam along a first indicator axis perpendicular to and passing through the central beam axis;

a second elongate needle indicator carried on the beam and movable along the beam axis with respect to the first needle indicator, the second needle indicator having a second tip end for positioning on the vehicle about a second reference point and selectively movable with respect to the beam along a second indicator axis perpendicular to and passing through the central beam axis;

a T-shaped bracket including a first tubular portion carried about the tubular inner beam member and a second tubular portion perpendicular to the first tubular portion and having an interior passage for receiving the first needle indicator; and a level permanently secured to the tubular outer beam member for visually indicating when the beam is level.

2. An alignment gauge as defined in claim 1, further comprising:

the tubular outer beam member has a rectangular cross-sectional configuration which defines an inner passageway having a substantially rectangular-shaped configuration;

the tubular inner beam member has a rectangular cross-sectional configuration; and a beam length securing member carried on the tubular outer beam member and selectively movable along a line passing substantially through opposing corners of the rectangular-shaped inner passageway for engaging the tubular inner beam member and pressing the tubular inner beam member toward a radially opposing corner of the interior passageway of the tubular outer beam member.

3. An alignment gauge as defined in claim 2, further comprising:

a second bracket including a second tubular bracket member having an interior substantially rectangular-shaped cross-sectional configuration for slidably receiving the second needle indicator therein; and a needle indicator length securing member carried on the second tubular bracket member and selectively movable along a line passing substantially through opposing corners of the interior rectangular-shaped configuration of the second tubular bracket member for engaging the second needle indicator and moving the second needle indicator toward a radially opposing interior corner of the second tubular bracket member.

4. An alignment gauge as defined in claim 1, further comprising:

the first reference point is a selected reference point under a hood of the vehicle;

the second reference point is a selected reference point on a bumper support; and the second needle indicator has a selected length for engaging the second reference point while the beam is horizontal and while the first needle indicator engages the first reference point.

5. An alignment gauge as defined in claim 1, further comprising:

each of the first and second needle indicators has a lower rod-like portion including the tip end, and an upper portion having a rectangular cross-sectional configuration.

6. An alignment gauge for checking the alignment of a vehicular frame having a plurality of reference points including a centerline point along a centerline of the vehicle, a right-side reference point, and a left-side reference point, comprising:

an elongate adjustable length beam having a central beam axis;

a needle indicator carried on the beam and having a selected tip end for positioning on the vehicle about a selected reference point and selectively movable with respect to the beam along an indicator axis perpendicular to and passing through the central beam axis;

the central axis of the beam and the indicator axis defining a reference plane;

a level permanently secured to the beam for visually indicating when the beam is level; and an alignment notch at an end of the beam and having a centering member axis lying within the reference plane and passing through a mid-point of the notch for engaging the centerline reference point on the vehicle while the needle indicator is positioned about the right-side reference point, and for engaging the centerline reference point while the needle indicator is repositioned about the left-side reference point, such that the right-side reference point and left-side reference points may be compared.

7. An alignment gauge as defined in claim 6, further comprising:

a T-shaped bracket including a first tubular portion carried on the beam and a second tubular portion perpendicular to the first tubular portion and a rectangular-shaped cross-sectional having interior passageway for receiving the needle indicator.

8. An alignment guage as defined in claim 7, further comprising:

the needle indicator includes a lower rod-like portion including the tip end, and an upper portion having a rectangular cross-sectional configuration for positioning within the second tubular portion; and an indicator length securing member carried on the second tubular portion and selectively movable along a line passing substantively through opposing corners of the rectangular-shaped cross-sectional interior passageway for engaging the upper portion of the needle indicator and pressing the needle indicator toward a radially opposing interior corner of the rectangular-shaped cross-sectional interior passageway of the second tubular portion.

9. An alignment gauge as defined in claim 6, wherein the elongate adjustable length beam further comprises:

a tubular outer beam member defining an inner passageway having a substantially rectangular-shaped configuration;

a tubular inner beam member slidably movable within the inner passageway of the tubular outer beam member; and a beam length securing member carried on the tubular outer beam member and selectively movable along a line passing substantially through opposing corner of the rectangular-shaped inner passageway for engaging the tubular inner beam member and pressing the tubular inner beam member toward a radially opposing corner of the passageway in the tubular outer beam member.

10. An alignment gauge as defined in claim 6, wherein the level is a horizontal level permanently secured to the tubular outer beam member for visually indicating when the beam is horizontal.

11. An alignment gauge for checking the alignment of a vehicular frame having a plurality of reference points thereon, comprising:

an elongate adjustable beam including a tubular outer beam member and a tubular inner beam member slidable movable within the outer beam member, the adjustable length beam having a central beam axis;

a first needle indicator carried on the beam and having a first tip end for positioning on the vehicle about a first reference point and selectively movable with respect to the beam along a first indicator axis perpendicular to the central beam axis;

a second needle indicator carried on the beam and selectively movable along the central beam axis with respect to the first needle indicator, the second needle indicator having a tip end for positioning on the vehicle about a second reference point;

the tubular outer beam member having a rectangular cross-sectional configuration which defines an inner passageway having a substantially rectangular-shaped configuration;

a tubular inner beam member having a rectangular cross-sectional configuration; and a beam length securing bolt carried on the tubular outer beam member and selectively movable along a line passing substantially through opposing corners of the rectangular-shaped inner passageway for engaging the tubular inner beam member and pressing the tubular inner beam member toward a radially opposing corner of the inner passageway of the tubular outer beam member.

12. An alignment gauge as defined in claim 11, further comprising:

a level permanently secured to the tubular outer beam member for visually indicating when the central beam axis is properly orientated.

13. An alignment gauge as defined in claim 11, further comprising:

the first needle indicator is carried on the beam and is selectively movable with respect to the beam such that the first indicator axis passes through the central beam axis; and the second needle indicator is carried on the beam and is movable along the beam axis such that the second indicator axis passes through the central beam axis.

14. An alignment gauge as defined in claim 13, further comprising:

a T-shaped bracket including a first tubular portion carried about the tubular inner beam member and a second tubular portion perpendicular to the first tubular portion and having an interior passage for receiving the second needle indicator.

15. An alignment gauge as defined in claim 11, further comprising:

a first and a second bracket each including a respective first and second tubular bracket member having an interior substantially rectangular-shaped cross-sectional configuration for slidably receiving a respective one of the first and second needle indicators therein; and a first and second needle indicator length securing bolt carried on the respective tubular bracket member and selectively movable along a line passing substantially through opposing corners of the interior rectangular-shaped configuration of the respective first and second tubular bracket member for engaging the respective first and second needle indicator and moving the respective first and second needle indicator toward a radially opposing interior corner of the respective first and second tubular bracket member.

16. An alignment gauge as defined in claim 11, further comprising:

each of the first and second needle indicators has a lower rod-like portion including the tip end, and an upper portion having a rectangular cross-sectional configuration.

* * * * *

UNITED STATES PATENT AND TRADEMARK OFFICE
CERTIFICATE OF CORRECTION

PATENT NO. : 4,939,848

DATED : July 10, 1990

INVENTOR(S) : Orville D. Armstrong

It is certified that error appears in the above-identified patent and that said Letters Patent is hereby corrected as shown below:

In Column 10, line 30, after "portion and" insert --having--.

In Column 10, line 31, delete "having".

Signed and Sealed this

Thirteenth Day of August, 1991

Attest:

HARRY F. MANBECK, JR.

Attesting Officer

Commissioner of Patents and Trademarks